United States Patent [19]

Partridge et al.

[11] Patent Number: 5,363,554
[45] Date of Patent: Nov. 15, 1994

[54] TITANIUM COMPRESSOR BLADE HAVING A WEAR-RESISTANT PORTION

[75] Inventors: Peter G. Partridge, Bristol; Andrew Wisbey, Farnborough, both of England

[73] Assignee: The Secretary of State for Defence in Her Britannic Majesty's Government of the United Kingdom of Great Britain and Northern Ireland, United Kingdom

[21] Appl. No.: 41,581

[22] Filed: Apr. 5, 1993

[30] Foreign Application Priority Data

Jun. 5, 1991 [GB] United Kingdom ............... 9112043

[51] Int. Cl.⁵ .............................................. B23P 15/00
[52] U.S. Cl. ..................................... 29/889.71; 29/889.1
[58] Field of Search ............... 29/889.7, 889.1, 889.71; 416/241

[56] References Cited

U.S. PATENT DOCUMENTS

| | | |
|---|---|---|
| 3,466,725 | 9/1969 | Kock .................... 29/889.71 |
| 3,660,882 | 5/1972 | Widowitz et al. ........ 29/889.71 |
| 4,071,184 | 1/1978 | Carlson et al. ......... 29/889.71 |
| 4,594,761 | 6/1986 | Murphy et al. ......... 29/889.71 |
| 4,802,828 | 2/1989 | Rutz et al. ........... 29/889.71 |
| 4,851,188 | 7/1989 | Schaefer et al. ....... 29/889.71 |
| 4,869,645 | 9/1989 | Verpoort . |  |
| 4,883,216 | 11/1989 | Patsfall ................ 29/889.1 |
| 5,063,662 | 11/1991 | Porter et al. . |  |
| 5,174,024 | 12/1992 | Sterrett .............. 29/889.71 |

FOREIGN PATENT DOCUMENTS

| | | |
|---|---|---|
| 0287371 | 10/1988 | European Pat. Off. ......... 29/889.7 |
| 0592956 | 10/1947 | United Kingdom ............. 29/889.7 |
| 708624 | 5/1954 | United Kingdom . |
| 1253187 | 11/1971 | United Kingdom ............ 29/889.71 |
| 1373508 | 11/1974 | United Kingdom . |
| 2184382A | 6/1987 | United Kingdom . |

OTHER PUBLICATIONS

United Kingdom Search Report.
International Search Report.
Soviet Inventions Illustrated, section P, Q, week D 07, 25 Mar. 1981, Derwent Publications Ltd., p. 36.

*Primary Examiner*—Irene Cuda
*Attorney, Agent, or Firm*—Nixon & Vanderhye

[57] ABSTRACT

A titanium based alloy compressor blade is given a wear-resistant portion such as a tip portion by producing an interfitting male/female joint between the blade and the wear-resistant portion in which the joint portion of the latter is produced with inwardly directed corrugations and the former is pressed at elevated temperature after assembly of the two parts so as to cause the material of the blade to flow into and conform to the shape of the latter and to produce a diffusion bond between the two parts. Interlayers may be used to improve chemical compatibility between the respective parts.

5 Claims, 2 Drawing Sheets

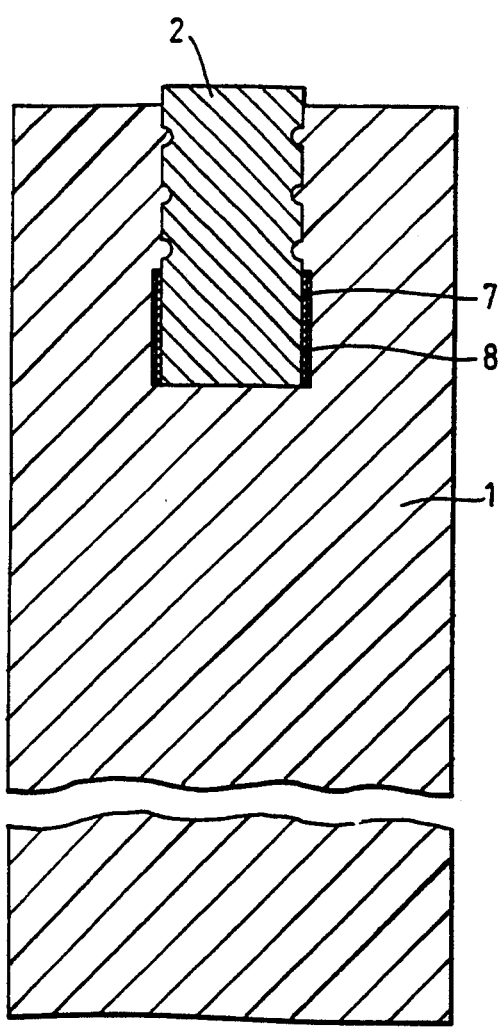
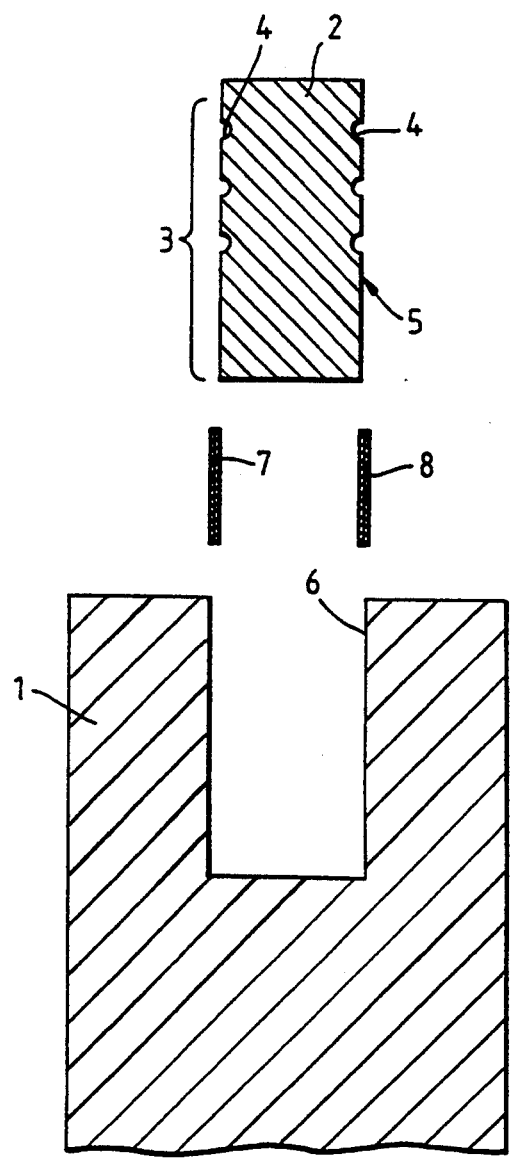

TITANIUM COMPRESSOR BLADE HAVING A WEAR-RESISTANT PORTION

BACKGROUND OF THE INVENTION

1. Field of the Invention

This invention relates to a method for producing a titanium or titanium based alloy compressor blade having a wear-resistant portion diffusion bonded thereto.

2. Discussion of Prior Art

In the text which follows, references to the use of titanium based alloys in the invention are to be interpreted as including within their scope the use of intermetallic compositions such as the titanium aluminides $Ti_3Al$ and $TiAl$.

The use of titanium based alloys is becoming increasingly widespread in the manufacture of compressor blades for aero gas turbine engines because such materials have favourable thermal properties which allow higher compressor operating temperatures in the continuing quest for improved engine efficiency. Titanium materials show good creep resistance at high temperatures and combine high strength with low density. However, they suffer from the drawback of poor tribological properties, being susceptible to galling, wear, fretting and stress corrosion cracking on rubbing surfaces. This can be of great significance in compressor applications because it is important that the compressor blade rotates with a minimum of tip clearance in order to maximise engine efficiency. Another important reason for avoiding rubbing contact with titanium based components is to minimise the risk of fire.

It is therefore desirable to provide the compressor blade with a tip of dissimilar material which is not prone to fire should rubbing contact occur. This material should also be wear-resistant so that tip clearance does not increase significantly during the operative lifetime of the compressor.

Known compressor blades achieve this by means of a plasma sprayed coating of ceramic material on their tip portion, but such tip coatings are not entirely satisfactory since they are prone to break away in use.

SUMMARY OF THE DISCLOSURE

The present invention provides a method for the production of an alternative compressor blade to the established tip coated blades and has as one of its aims the production of blades with improved durability and dimensional control.

The invention is a method of producing a titanium or titanium based alloy compressor blade having a wear-resistant portion of a dissimilar material, comprising the following steps:

(a) producing a first part for the blade from a material which is hard in comparison to the titanium or titanium alloy, said first part including a joint portion of male or female form having at least one inwardly-directed corrugation upon its surface:

(b) producing a second part for the blade from titanium or a titanium alloy, said second part including a joint portion of complementary form to that of the first part and being of dimensions such that it can be placed within or around the first part, and (c) assembling the first and second parts together by interfitting their joint portions.

characterised in that the two parts are pressed together at elevated temperature to superplastically deform the titanium or titanium alloy material of the second part such that it flows into and fills the or each corrugation in the first part, and in that conditions of elevated temperature and pressure are maintained to produce a diffusion bond between the first and second parts.

During the pressing stage, the two parts are preferably enclosed within an envelope and hot isostatically pressed in a conventional apparatus.

The wear-resistant first part is typically formed from a nickel based alloy, a cobalt based alloy, a nickel-iron based alloy or steel. To achieve a good diffusion bonded join between the first and second parts one or more interlayers may be provided between the respective joint portions prior to the pressing stage to improve the chemical compatibility of the respective parts. For example, a nickel foil may be placed adjacent to the surface of the first part and a tantalum foil adjacent the surface of the second part. Alternatively, the interlayers may be formed by electroplating or by using physical vapour deposition techniques such as sputtering. These methods are particularly useful where the configuration of the parts is such that foil interlayers would be difficult to apply.

One of the drawbacks of using tantalum for this purpose is that it is susceptible to oxidation degradation if exposed to oxygen when at the operating temperature of typical aero engine compressor blades. To avoid such degradation, precautions must be taken to prevent access of environmental oxygen to the tantalum interlayer within the joint. This is accomplished by placing the tantalum foil between the two parts prior to joining at a position separated from the exposed edge of the join by the at least one corrugation on the joint portion of the first part. After the superplastic forming/diffusion bonding process which results in the titanium material of the second part filling the corrugation in the wall of the first part and in the formation of a diffusion bond at the interface between the second part and the first part, at least one barrier to oxygen diffusion is present in the path between the exposed surface and the site of the tantalum interlayer. In effect, a two-part joint structure is created.

The wear-resistant first part referred to above is preferably produced with a series of the corrugations therein in the region of the joining portion which is adjacent to the exposed end of the joint when assembled, and with a plane uncorrugated area of the joining portion in the region—conveniently called the root portion—which is remote from the exposed end of the joint when assembled. In such an arrangement the multiple corrugations provide an increased barrier to oxygen diffusion and also provide a mechanical key between the assembled parts which reinforces the diffusion bond. In addition, the root portion provides an area within which the foil interlayers can be introduced conveniently prior to assembly and subsequent bonding of the parts.

The wear-resistant first part can be a blade tip or a leading edge part, for example. In the former case it is convenient to form the joining portion as the male part of the joint. In the latter case it might be convenient to form the joining portion as the female part of the joint.

Typical conditions for the pressing stage by which the parts are formed to conform to one another and bonded together are as follows: pressure-20 MPa; temperature-900° C.; time-1 hour.

BRIEF DESCRIPTION OF THE DRAWINGS

The invention will now be described by way of example with reference to the drawings, of which:

FIG. 2 is a section view of the compressor blade along the line AA indicated in FIG. 1, and FIG. 3 is an exploded sectional view showing the parts of the compressor blade prior to assembly.

DETAILED DISCUSSION OF PREFERRED EMBODIMENTS

Figure 1:
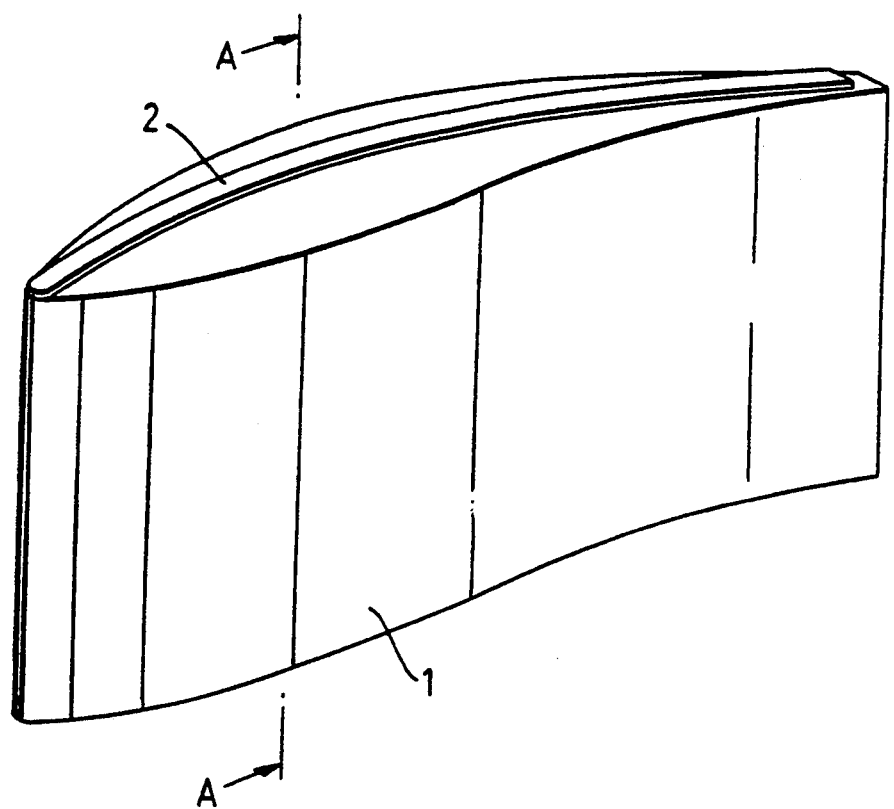
FIG. 1 is an oblique projection of a compressor blade having a wear resistant tip.

In FIG. 1, a compressor blade 1 of a titanium alloy such as IMI 318 (nominal composition by weight: Ti base-6% Al-4% V) is depicted with a tip 2 of a hard alloy such as HS6 (nominal composition by weight: Co base-27% Cr-5% W-2.5% Ni-2% Fe-1% C). The cross-sectional views of FIGS. 2 and 3 show the form of the joint between the blade 1 and the tip 2. The tip 2 is formed with a male joint portion 3 having a series of inwardly directed corrugations 4 formed in its side walls and a plain portion 5 at the root end thereof. These corrugations 4 are typically of blended semicircular section. The blade 1 is formed with a female joint portion 6 and this is free of corrugations and dimensioned such that the male joint portion 3 of the tip 2 is a clearance fit within it.

At the tip of the male portion 5 are present Foils 7 and 8 of nickel and tantalum, respectively, are provided in the region of the plain portion 5 of the tip 2. These foils are spot welded in position on the plain portion 5 prior to interfitting of the two parts 1 and 2.

The procedure for producing the composite article is as follows: First the two foils 7 and 8 are positioned upon the plain portion 5 of the tip 2 and spot welded thereto. Then the tip 2 and blade 1 are assembled such that the male joint portion 3 of the former (with foils in place thereon) is located within the female joint portion 6 of the latter. The two parts 1 and 2 are then enclosed within a metal canister (not shown) to be hot isostatically pressed.

Blanks of the abovementioned materials have been bonded together satisfactorily using 25 μm interlayers of nickel and tantalum foil as described with corrugations 1.5 mm wide and 0.5 mm deep, under a pressure of 20 MPa at 900° C. for a period of 1 hour. The same combination of materials has also been used with interlayers of 12.5 μm thickness and without any interlayers at all. The shear strengths for the resulting bonds are listed in the table below.

At first sight it appears as though the increase in interlayer thickness from 12.5 μm to 25 μm is detrimental to joint quality, since the example with the thicker interlayers has the lowest shear strength. However, the advantage of using interlayers is that joints so-formed show remarkable improvements in toughness and ductility, joints without interlayers being very brittle indeed. Thus, although the example with 25 μm interlayers records a shear strength of only 406 MPa, this is compensated by improved toughness and ductility over the example with 12.5 μm interlayers.

The table also includes an example of bonding a wear-resistant nickel alloy such as HS242 (nominal composition by weight: Ni base-25% Mo-8% Cr-1% Fe-0.5% Mn-0.4% Si-0.2% Al-0.04% C) to Super $\alpha_2$ (Ti$_3$Al) intermetallic. Exactly the same procedure is followed, except that a slightly higher temperature is used to ensure that the blade portion undergoes superplastic deformation to the degree necessary to effect flow of blade material into the corrugations of the tip portion. This same higher temperature is maintained as part of the diffusion bonding process.

Other combinations of materials suitable for producing the composite compressor blades have been joined in a similar regime and some of these are also included in the table.

In the table, commercial materials are designated by their trade designations for which nominal compositions are as follows:

IMI 829:- Ti base - 5.5% AL - 3.5% Sn - 3% Zr - 1% Nb - 0.25% Mo - 0.3% Si
IN 907:- Fe base - 38% Ni - 13% Cr - 4.7% Nb - 1.5% Ti - 0.15% Si - 0.03% Al
S526:- Fe base - 18% Cr - 10% Ni - 1.2% Mn - 0.6% Si - 0.08% C(max)
Steel 3046:- Fe base - 18.3% Cr - 9% Ni - 1.1% Mn - 0.3% Si - 0.04% C
Super $\alpha_2$:- Ti base - 14% Al - 19% Nb - 3% V - 2% Mo

| Metals bonded | Interlayer (μm) | Bonding regime temperature (°C.) | pressure (MPa) | time (hours) | Shear strength (MPa) |
|---|---|---|---|---|---|
| INI829/IN907 | nil | 975 | 20 | 1.0 | 310 |
| IMI829/Nb44% Ti/ IN907 | Nb44Ti - 100 | 975 | 20 | 1.0 | 330 |
| IMI829/Zr/IN907 | Zr - 30 | 975 | 20 | 1.0 | — |
| IMI829/V/Cu/ IN907 | V - 25 Cu - 25 | 925 | 20 | 1.0 | 300 |
| IMI829/Nb/Ni IN907 | Nb - 25 Ni - 25 | 975 | 20 | 1.0 | 306 |
| IMI829/Ta/Ni IN907 | Ta - 100 Ni - 25 | 975 | 20 | 1.0 | 455 |
| IMI829/Ta/NI/ IN907 | Ta - 25 Ni - 25 | 975 | 20 | 1.0 | 440 |
| IMI829/Ta/Ni/ IN907 | Ta - 50 Ni - 25 | 990 | 20 | 1.5 | — |
| IMI829/Ta/Ni/ HS242 | Ta - 25 Ni - 25 | 975 | 150-300 | 1.0 | 405 |
| IMI318/S526 | nil | 850 | 13.5 | 1.0 | — |
| IMI318/V/Cu/ S526 | V - 25 Cu - 25 | 850 | 20 | 1.0 | — |
| IMI318/V/Cu/ steel 3046 | V Cu } 20-30 | 850 | 10 | 1.0 | — |
| IMI318/HS6 | nil | 900 | 20 | 1.0 | 500 |
| IMI318/Ta/Ni/ | Ta - 12.5 | 900 | 20 | 1.0 | 529 |

| | -continued | | | | |
|---|---|---|---|---|---|
| HS6 | Ni - 12.5 | | | | |
| IMI318/Ta/Ni/ HS6 | Ta - 25 Ni - 25 | 900 | 20 | 1.0 | 406 |
| Super α$_2$/Ta/Ni/ HS242 | Ta - 25 Ni - 25 | 990 | 20 | 1.0 | 487 |
| IMI318/V/Cr/ HS6 | V - 25 Cr - 5-10 | 900 | 20 | 1.0 | 331 |
| IMI318/Mo/Ni/ HS6 | Mo - 25 Ni - 25 | 900 | 20 | 1.0 | 415 |

We claim:

1. A method of producing a titanium or titanium based alloy compressor blade having a wear-resistant portion of non-titanium based metallic material, comprising the following steps:

producing a first part for the blade from said material which is hard in comparison to the titanium or titanium based alloy, said first part including a joint portion of one of a male and female form having at least one inwardly-directed corrugation upon its surface;

producing a second part for the blade from titanium or a titanium alloy, said second part including a joint portion of one of a complementary female and male form to the first part and being of dimensions such that it can be placed within or round the first part, and assembling the first and second parts together by interfitting their joint portions, pressing the two parts together at elevated temperature to superplastically deform the titanium or titanium alloy material of the second part such that it flows into and fills the or each corrugation in the first part, and maintaining the conditions of elevated temperature and pressure to produce a diffusion bond between the first and second parts.

2. A method as claimed in claim 1 wherein the two parts are enclosed together in an envelope after assembly and in that the pressing stage is a hot isostatic pressing stage.

3. A method as claimed in claim 1 wherein one or more interlayers is placed between the two parts prior to assembly thereof to improve the subsequent bonding of the two parts.

4. A method as claimed in claim 3 wherein said interlayers are provided around the base of the joint to be formed, such that the part of the joint which is susceptible to atmospheric attack has no exposed interlayers.

5. A method as claimed in claim 1 wherein the first part incorporates a series of the inwardly directed corrugations in a region adjacent the exposed end of the joint.

* * * * *